United States Patent
Radford (10) Patent No.: US 6,851,649 B1
(45) Date of Patent: Feb. 8, 2005

(54) METHODS AND SYSTEMS FOR CONTROLLING WHEEL BRAKES ON AIRCRAFT AND OTHER VEHICLES

(75) Inventor: Michael A. Radford, Mill Creek, WA (US)

(73) Assignee: The Boeing Company, Seattle, WA (US)

( * ) Notice: Subject to any disclaimer, the term of this patent is extended or adjusted under 35 U.S.C. 154(b) by 18 days.

(21) Appl. No.: 10/641,461

(22) Filed: Aug. 14, 2003

(51) Int. Cl.⁷ .................................................. B60T 8/10
(52) U.S. Cl. .................... 244/111; 188/264 R; 303/126; 303/191
(58) Field of Search ...................... 244/11, 111; 303/20, 303/93, 126, 190, 176; 188/344, 264 R; 701/71, 76, 79

(56) References Cited

U.S. PATENT DOCUMENTS

| | | | |
|---|---|---|---|
| 2,794,609 A | 6/1957 | Perry | |
| 3,520,575 A | * 7/1970 | Steigerwald | ................. 303/126 |
| 3,537,551 A | 11/1970 | Serra | |
| 3,776,333 A | 12/1973 | Mathauswer | |
| 3,926,479 A | * 12/1975 | Bissell et al. | .......... 303/122.04 |
| 3,948,569 A | 4/1976 | Gentet | |
| 3,993,174 A | 11/1976 | Williams et al. | |
| 4,006,941 A | 2/1977 | DeVlieg | |
| 4,007,970 A | * 2/1977 | Romero | ....................... 303/126 |
| 4,008,868 A | * 2/1977 | Berg | .......................... 244/111 |
| 4,180,223 A | 12/1979 | Amberg | |
| 4,195,803 A | 4/1980 | Faure | |
| 4,205,735 A | 6/1980 | Murray | |
| 4,221,350 A | 9/1980 | Moser | |
| 4,402,478 A | 9/1983 | Martin | |
| 4,430,715 A | 2/1984 | Gentet | |
| 4,489,123 A | 12/1984 | Schijve | |
| 4,500,589 A | 2/1985 | Schijve | |
| 4,591,213 A | 5/1986 | Rapoport | |
| 4,646,242 A | * 2/1987 | Valaas | ......................... 701/70 |
| 4,923,056 A | 5/1990 | Nedelk | |
| 4,935,291 A | 6/1990 | Gunnink | |
| 4,986,610 A | 1/1991 | Beck | |
| 4,992,323 A | 2/1991 | Vogelesang | |
| 5,039,566 A | 8/1991 | Skubic | |
| 5,160,771 A | 11/1992 | Lambing | |
| 5,429,326 A | 7/1995 | Garesche | |
| 5,547,735 A | 8/1996 | Roebroeks | |
| 5,615,934 A | 4/1997 | Abuelsamid | |
| 5,665,450 A | 9/1997 | Day | |
| 6,478,252 B1 | 11/2002 | Stimson | |
| 6,604,708 B1 | 8/2003 | DeVlieg | |
| 2004/0065776 A1 | 4/2004 | De Vlieg | |

FOREIGN PATENT DOCUMENTS

| | | |
|---|---|---|
| DE | 555392 | 7/1932 |
| DE | 1756129 | 2/1970 |

OTHER PUBLICATIONS

Milewski, et al., "Physical Properties of Glass Ribbon", Handbook of Reinforcements for Plastics, Van Nostrand Reinhold Co. 1987.

(List continued on next page.)

*Primary Examiner*—Galen Barefoot
(74) *Attorney, Agent, or Firm*—Perkins Coie LLP (57) ABSTRACT

Methods and systems for controlling wheel brakes on aircraft and other vehicles. In one embodiment, a method for slowing a vehicle on the ground can include applying a first brake to a first wheel and a second brake to a second wheel. The method can further include determining if a first speed sensor associated with the first wheel and a second speed sensor associated with the second wheel are operative. When the first and second speed sensors are operative, the first and second brakes can be controlled according to a first routine. Conversely, when at least one of the first and second speed sensors is inoperative, the first and second brakes can be controlled according to a second routine.

44 Claims, 7 Drawing Sheets

OTHER PUBLICATIONS

Olson, James R., "Fabrication and Mechanical Properties of an Optically Transparent Glass Fiber/Polymer Matrix Composite," Journal of Composite Materials, pp 1181–1192, vol. 26, No. 8, (1992) Technome Publishing Co.

Lin, Hongy et al., "The Effect of Fiber Annealing on the Properties of an Optically Transparent PMMA Composite", Composites Science and Technology 50 (1994) pp 367–372, Elsevier Science Publishers Ltd.

Weaver, Kevin D., Interfacial Bonding and Optical Transmission for Transparent Fiberglass/Poly (Methyl Methacrylate) Composites, Polymer Composites, Apr. 1995, vol. 16, No. 2, pp. 161–169.

Lin, H. et al., "Temperature and wavelength dependent transmission of optically transparent glass fibre poly (methyl methacrylate) composites", Journal of Material Science 29 (1994), pp 5193–5198, Chapman Hall.

Lin, Hongy et al., "Aging Behavior of Optically Transparent Poly (Methyl Methacrylate) Compsites", Polymer Composites, Oct. 1993, vol. 11, No. 5, pp. 402–409.

Weaver, Kevin D. et al., "Preparation and Properties of Optically Transparent, Pressure–Cured Poly (Methyl Methacrylate) Composites", Polymer Composites, Dec. 1993, vol. 14, No. 5, pp. 515–523.

Lin, Hongy et al., "Model for the temperature dependent transmission of optically transparent poly (methyl methacrylate) composites", Journal of Material Research, (Feb. 1993), vol. 8 No. 2, pp. 364–370, Materials Research Society.

Lin Hongy et al., "Optical and Mechanical Properties of Optically Transparent Poly(methyl methacrylate) Composites", Polymer Engineering and Science, Mar. 1992, vol. 32, No. 5, pp 344–350.

* cited by examiner

METHODS AND SYSTEMS FOR CONTROLLING WHEEL BRAKES ON AIRCRAFT AND OTHER VEHICLES

TECHNICAL FIELD

The following disclosure relates generally to wheel brake systems and, more particularly, to wheel brake systems for aircraft and other vehicles.

BACKGROUND

Figure 1:
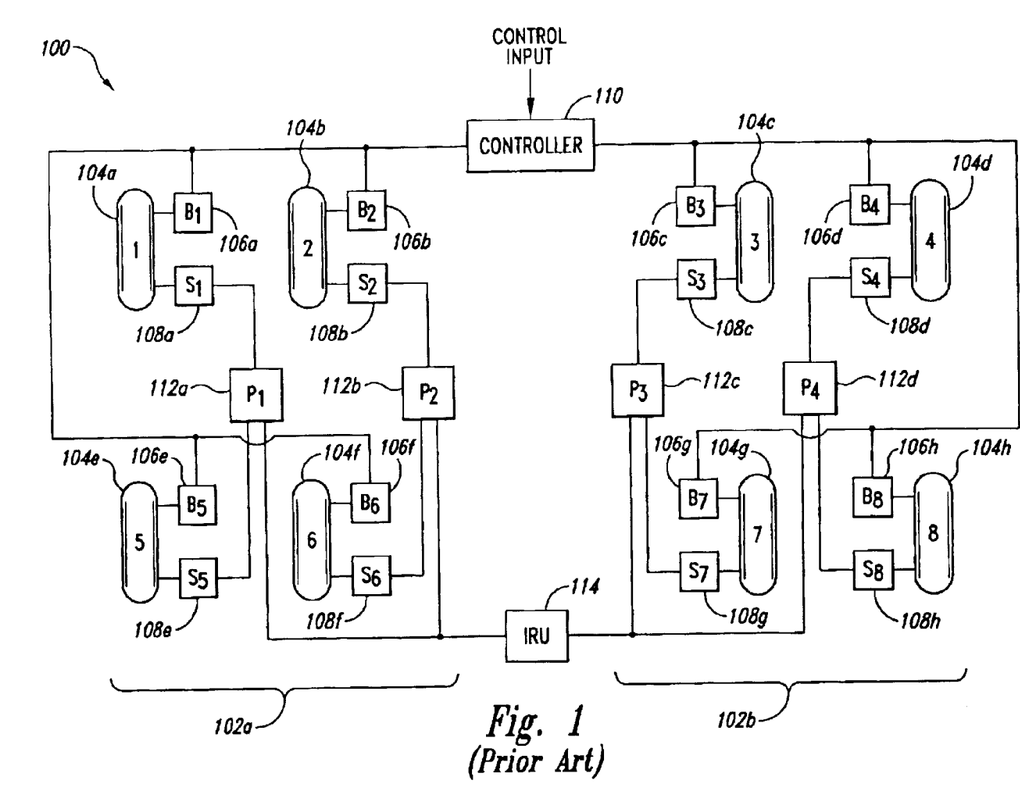
FIG. 1 is a schematic top view of an aircraft main landing gear system configured in accordance with the prior art.

Conventional jet transport aircraft typically include landing gears with anti-skid or anti-lock brake systems. One such brake system is illustrated in FIG. 1, which shows a schematic top view of an aircraft main landing gear system 100 configured in accordance with the prior art. The prior art landing gear system 100 includes a left or first wheel truck 102a and a right or second wheel truck 102b. On a typical aircraft, the first wheel truck 102a can extend downwardly from a left wing (not shown), and the second wheel truck 102b can extend downwardly from an opposite right wing (also not shown). The first wheel truck 102a can include four landing wheels 104 (shown as a first landing wheel 104a, a second landing wheel 104b, a fifth landing wheel 104e, and a sixth landing wheel 104f). Similarly, the second wheel truck 102b can also include four landing wheels 104 (shown as a third landing wheel 104c, a fourth landing wheel 104d, a seventh landing wheel 104g, and an eighth landing wheel 104h). Each wheel truck 102 can further include four wheel brakes 106 (shown as brakes 106a–h) and four wheel speed sensors 108 (shown as speed sensors 108a–h) operatively associated with the wheels 104 in one-to-one correspondence.

The landing gear system 100 can further include a wheel brake controller 110 and four processors 112 (shown as processors 112a–d). The controller 110 can be configured to receive brake control inputs from a pilot (not shown) and send corresponding control signals to the brakes 106. Each of the processors 112 can be associated with a pair of the wheels 104. For example, the first processor 112a can be operatively connected to the speed sensors 108 of the first wheel 104a and the fifth wheel 104e. Similarly, the second processor 112b can be operatively connected to the second wheel 104b and the sixth wheel 104f. While four separate processors 112 are depicted in FIG. 1 for purposes of illustration, in practice two or more of the processors 112 may be combined into a single processor that provides the same function as the two or more processors. The landing gear system 100 can additionally include an inertial reference unit 114 ("IRU 114") configured to provide aircraft speed information to the processors 112.

In operation, the pilot initiates a brake control input from the cockpit of the aircraft. The controller 110 receives this control input, and in response sends a corresponding control signal to one or more of the brakes 106. Although a single controller 110 is shown in FIG. 1 for purposes of illustration, in some brake systems each wheel may have a dedicated controller, or conversely, the controller may be omitted and each brake may receive the control input directly from the pilot. The control input from the pilot may be an electrical signal, or it may be transmitted by actuator cable to a corresponding hydraulic valve associated with the brake 106. The brakes 106 are applied to the wheels 104 in response to the signals from the controller 110 to slow the aircraft in accordance with the pilot's control input.

Each of the processors 112 can perform routines configured to prevent the wheels 104 from locking up or skidding undesirably when the pilot applies the brakes 106. These routines can include an individual wheel anti-skid routine, a locked-wheel protection routine, and a hydroplane/touchdown protection routine. The individual wheel anti-skid routine can prevent a wheel from skidding due to overly rapid deceleration. As the brake 106a, for example, is applied to the first wheel 104a, the speed sensor 108a measures wheel speed and transmits this information to the first processor 112a. The first processor 112a monitors the deceleration of the first wheel 104a, and compares this deceleration to a maximum allowable deceleration. This maximum allowable deceleration can equate to a threshold above which the first wheel 104a would likely lock up and skid. If the deceleration of the first wheel 104a exceeds the maximum allowable deceleration, then the first processor 112a transmits a signal to the brake 106a causing the brake 106a to momentarily release. This release allows the wheel 104a to momentarily rotate freely, thus preventing wheel skid.

The locked-wheel protection routine can prevent wheel skid by preventing gross disparity between wheel speeds in a group of wheels. Referring to the first wheel 104a and the fifth wheel 104e for purposes of illustration, as the brakes 106 are being applied, the speed sensors 108 transmit wheel speed information to the first processor 112a. The first processor 112a compares the speed of the first wheel 104a to the speed of the fifth wheel 104e. If one of the wheel speeds is less than the other wheel speed by a preset amount or more, then the first processor 112a transmits a signal to the brake 106 of the slower wheel 104, causing that particular brake 106 to momentarily release. This momentary release allows the slower wheel 104 to come up to speed and prevents the slower wheel 104 from going into a deep skid during heavy braking.

The hydroplane/touchdown protection routine applies to the aft wheels 104 (i.e., the fifth wheel 104e, the sixth wheel 104f, the seventh wheel 104g, and the eighth wheel 104h) to prevent sustained hydroplane-induced wheel lockups during landing. This protection is applied only to the aft wheels 104 because these wheels touch down first during a typical landing. In this routine, the IRU 114 determines a first speed based on the speed of the aircraft and transmits this information to, for example, the first processor 112a. The first processor 112a determines a second speed based on the speed of the fifth wheel 104e as measured by the speed sensor 108e. The first processor 112a then compares the first speed from the IRU 114 to the second speed from the speed sensor 108e. If the second speed is less than the first speed by a preset amount or more, then the first processor 112a transmits a signal to the brake 106e causing the brake 106e to momentarily release. In this manner, the hydroplane/touchdown routine prevents the brake 106e from being applied to the fifth wheel 104e until the fifth wheel 104e is rotating at a speed commensurate with the aircraft speed, thus preventing wheel skid.

SUMMARY

The present invention is directed generally toward methods and systems for controlling wheel brakes on aircraft and other vehicles. A method for slowing a vehicle on the ground in accordance with one aspect of the invention can be used with a vehicle having a wheel for supporting a portion of the vehicle on the ground. The vehicle can further have a brake and a speed sensor associated with the wheel. The method can include receiving a control input to slow the vehicle, and determining if the speed sensor is operative. When the speed sensor is operative, the method can further include controlling the brake according to a first routine in response to receiving the control input. Conversely, when the speed sensor is inoperative, the method can further include controlling the brake according to a second, different routine in response to receiving the control input.

Another method for slowing a vehicle on the ground in accordance with one aspect of the invention can be used with a vehicle having at least first and second wheels for supporting a portion of the vehicle on the ground. The vehicle can further have a first brake and a first speed sensor operatively associated with the first wheel, and a second brake and a second speed sensor operatively associated with the second wheel. The method can include receiving a first control input to slow the vehicle, and applying the first brake to the first wheel and the second brake to the second wheel in response to receiving the first control input. The method can further include determining if the first and second speed sensors are operative. When the first and second speed sensors are operative, a first speed of the first wheel can be compared to a second speed of the second wheel to determine if the seeds differ by a preset amount. If the first speed differs from the second speed by the preset amount, the application of at least one of the first and second brakes can be changed. Conversely, when at least one of the first and second speed sensors is inoperative, the method can include continuing to apply the first brake to the first wheel and the second brake to the second wheel while receiving the first control input.

In another aspect of the invention, changing the application of at least one of the first and second brakes when the first and second speed sensors are operative can include releasing at least one of the first and second brakes if the first wheel speed differs from the second wheel speed by the preset amount. For example, in one embodiment, the first brake can be released if the speed of the first wheel is slower than the speed of the second wheel by the preset amount. In a further aspect of the invention, continuing to apply the first brake to the first wheel and the second brake to the second wheel when at least one of the first and second speed sensors is inoperative can include continuing to apply the first and second brakes if the first wheel speed differs from the second wheel speed by the preset amount.

An aircraft system configured in accordance with one aspect of the invention can include a first landing wheel configured to support at least a portion of an aircraft on the ground, and at least a second landing wheel configured to support at least a portion of the aircraft on the ground. The aircraft system can further include a first brake and a first speed sensor associated with the first wheel, a second brake and a second speed sensor associated with the second wheel, and a processor operatively coupled to the first and second brakes and the first and second speed sensors. The processor can be configured to respond to a first control input by applying the first brake to the first wheel and the second brake to the second wheel to slow the aircraft. The processor can be further configured to determine if the first and second speed sensors are operative and, when the first and second speed sensors are operative, determine if a first speed of the first wheel differs from a second speed of the second wheel by a preset amount. If the first speed differs from the second speed by the preset amount, the processor can change the application of at least one of the first and second brakes. Conversely, when at least one of the first and second speed sensors is inoperative, the processor can be configured to continue applying the first brake to the first wheel and the second brake to the second wheel while receiving the first control input.

DETAILED DESCRIPTION

The following disclosure describes wheel brake systems for aircraft and other vehicles, and associated methods for using such systems to slow vehicles. Certain specific details are set forth in the following description and in FIGS. 2–7 to provide a thorough understanding of various embodiments of the invention. Other details describing well-known structures and systems often associated with aircraft and aircraft landing gear brake systems are not set forth in the following description to avoid unnecessarily obscuring the description of the various embodiments of the invention.

Many of the details, dimensions, angles, and other specifications shown in the Figures are merely illustrative of particular embodiments of the invention. Accordingly, other embodiments can have other details, dimensions, and specifications without departing from the spirit or scope of the present invention. In addition, other embodiments of the invention may be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 210 is first introduced and discussed with reference to FIG. 2.

Figure 2:
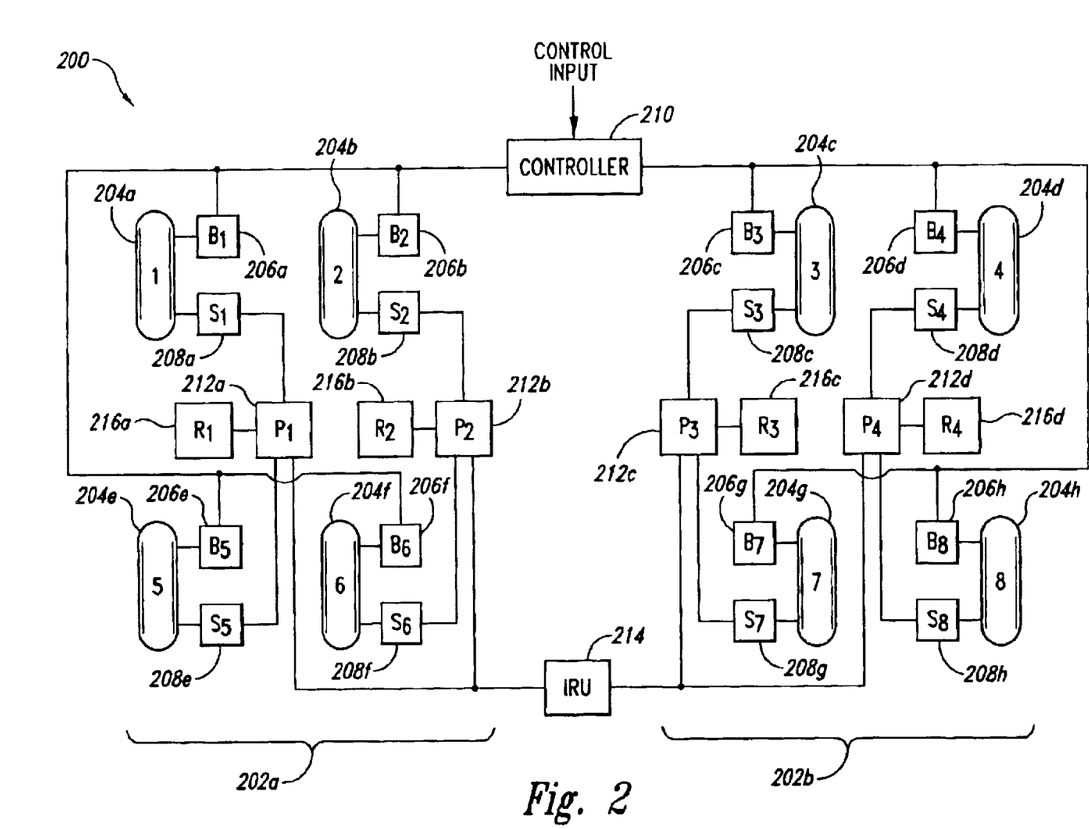
FIG. 2 is a schematic top view of an aircraft main landing gear system configured in accordance with an embodiment of the invention.

FIG. 2 is a schematic top view of an aircraft main landing gear system 200 configured in accordance with an embodiment of the invention. In one aspect of this embodiment, the landing gear system 200 includes a first wheel truck 202a and a second wheel truck 202b. The first wheel truck 202a can include four landing wheels 204 (shown as a first landing wheel 204a, a second landing wheel 204b, a fifth landing wheel 204e, and a sixth landing wheel 204f). Similarly, the second wheel truck 202b can also include four landing wheels 204 (shown as a third landing wheel 204c, a fourth landing wheel 204d, a seventh landing wheel 204g, and an eighth landing wheel 204h). Each wheel truck 202 can further include four wheel brakes 206 (shown as brakes 206a–h) and four wheel speed sensors 208 (shown as speed sensors 208a–h) operatively associated with the wheels 204 in one-to-one correspondence. In other embodiments, the landing gear system 200 can include more or fewer wheel trucks 202 and/or more or fewer landing wheels 204. For example, in one embodiment described in detail below, a landing gear system configured in accordance with an embodiment of the invention can include a wheel truck having six landing wheels. Accordingly, aspects of the invention are not limited to the particular landing gear configuration illustrated in FIG. 2. Further, aspects of the invention are also not limited to aircraft. For example, in another embodiment, a brake system configured in accordance with aspects of the invention can be used with an automobile.

In another aspect of this embodiment, the landing gear system 200 further includes a wheel brake controller 210, an inertial reference unit (IRU) 214, and four processors 212 (shown as a first processor 212a, a second processor 212b, a third processor 212c, and a fourth processor 212d). The controller 210, the IRU 214, and the processors 212 can be at least generally similar in structure and function to their counterparts described above with reference to FIG. 1. Accordingly, the controller 210 receives brake control inputs from a pilot (not shown) and sends corresponding control signals to one or more of the brakes 206. The brakes 206 are applied to the wheels 204 in response to the control signals. In addition, the processors 212 can implement individual anti-skid routines, locked-wheel protection routines, and hydroplane/touchdown protection routines as described above in response to the information received from the speed sensors 208 and/or the IRU 214.

In a further aspect of this embodiment, the landing gear system 200 additionally includes four bypass components 216 (shown as a first bypass component 216a, a second bypass component 216b, a third bypass component 216c, and a fourth bypass component 216d). Each of the bypass components 216 can operatively associated with one of the processors 212 in one-to-one correspondence. (In other embodiments, one or more of the bypass components 216 can be operatively associated with more than one of the processors 212, thus allowing one or more of the bypass components 216 to be omitted). As described in greater detail below, the bypass components 216 can be configured to cause the processors 212 to bypass one or more of the wheel anti-skid/anti-lock routines described above if one of the speed sensors 208 is determined to be inoperative. One advantage of this feature is that one of the brakes 206 will not be released on the basis of an erroneous indication (e.g., from the inoperative speed sensor 208) that the corresponding wheel 204 has stopped rotating.

The landing gear system 200 of FIG. 2 includes a single controller 110 and four processors 112 for purposes of illustration only. Accordingly, in other embodiments, the controller 210 may be omitted, and pilot control inputs may go directly from the cockpit to the brakes 206 (or to brake actuators) as either electrical or mechanical control inputs or signals. Further, in other embodiments, the functions of two or more of the processors 212, or two or more of the bypass components 216, may be combined into a single processor or bypass component, depending on the particular situation.

Figure 3:
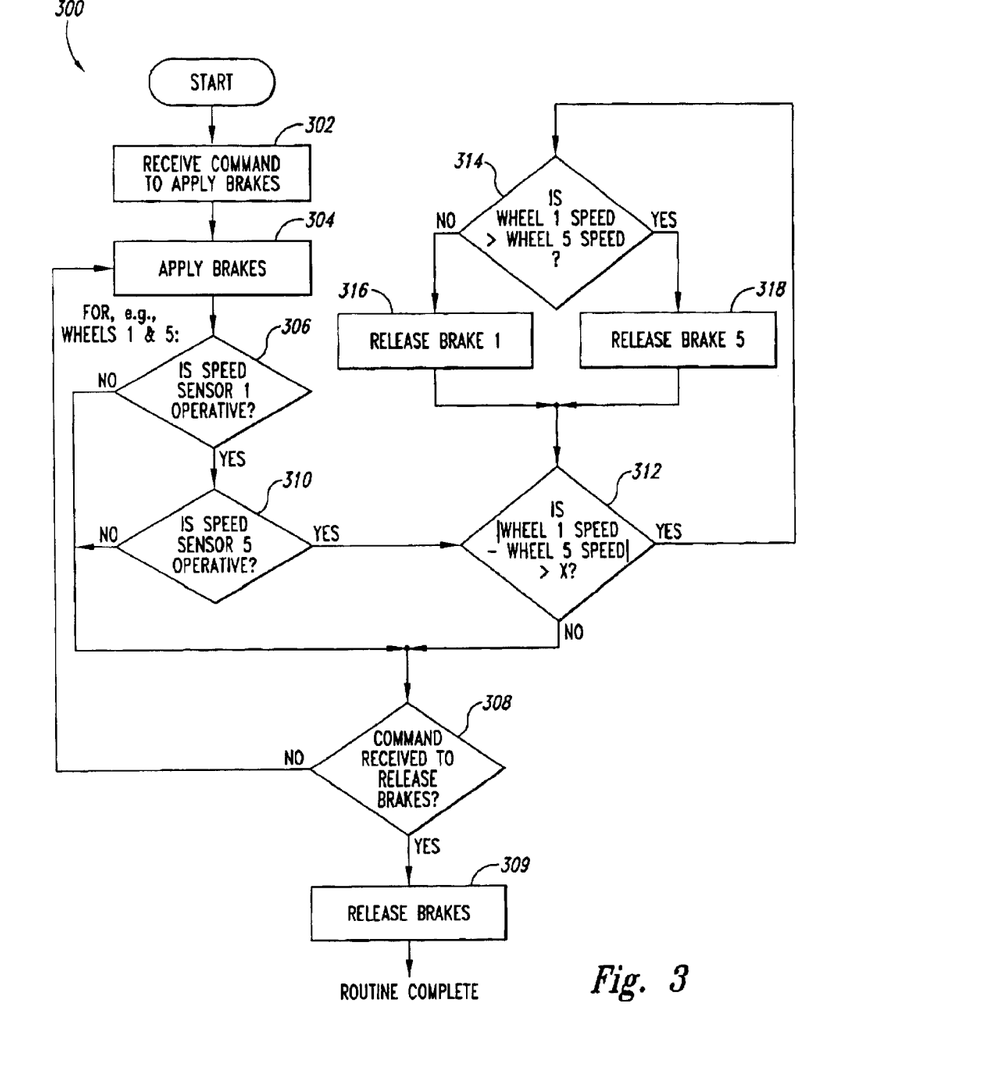
FIG. 3 is a flow diagram illustrating a routine for bypassing locked-wheel protection in accordance with an embodiment of the invention.

FIG. 3 is a flow diagram illustrating a routine 300 for bypassing locked-wheel protection in accordance with an embodiment of the invention. For purposes of illustration, the routine 300 is described below with reference to the landing gear system 200 of FIG. 2. In other embodiments, the routine 300 can be implemented by other brake systems for other vehicles, including land-based vehicles such as automobiles and trucks. In block 302, the routine 300 receives a control input to apply the brakes 206 to the wheels 204. In block 304, the routine 300 applies the brakes 206 in response to the control input. Referring to the first wheel 204a and the fifth wheel 204e as a grouped wheel pair for purposes of illustration, in decision block 306, the routine 300 determines if the first speed sensor 208a is operative. If the first speed sensor 208a is inoperative, then the routine 300 bypasses locked-wheel protection for the grouped wheel pair and proceeds to decision block 308 to determine if a control input has been received to release the brakes 206. If no such control input has been received, then the routine 300 returns to block 304 and continues to apply the brakes 206. Conversely, if a control input to release the brakes 206 has been received, then in block 309 the routine 300 releases the brakes 206 and the routine 300 is complete.

Returning to decision block 306, if the first speed sensor 208a is operative, then the routine 300 proceeds to decision block 310 to determine if the fifth speed sensor 208e is also operative. If the fifth speed sensor 208e is inoperative, then the routine 300 bypasses locked-wheel protection for the grouped wheel pair and proceeds to decision block 308 as described above. Conversely, if both the first speed sensor 208a and the fifth speed sensor 208e are operative, then the routine 300 implements locked-wheel protection for the grouped wheel pair by proceeding to decision block 312.

In decision block 312, the routine 300 determines if the difference in speed between the first wheel 204a and the fifth wheel 204e exceeds a preset amount X. In one embodiment, the preset amount X can correspond to a difference in speed that would result in skidding of the slower wheel. For example, in one embodiment, such a difference in speed can be equivalent to about 30% of the speed of the faster wheel.

In other embodiments, the difference in speed for a particular application may include other values. If the difference in speed between the first wheel 204a and the fifth wheel 204e is not greater than the preset amount X, then the routine 300 proceeds to decision block 308 and continues as described above. Conversely, if the difference in wheel speeds is greater than the preset amount X, then the routine 300 proceeds to decision block 314 and determines which of the two wheels 204a or 204e is the slower wheel. If the first wheel 204a is the slower wheel, then in block 316 the routine 300 releases the first brake 206a so that the first wheel 204a can come up to speed and not skid. Conversely, if the fifth wheel 204e is the slower wheel, then in block 318 the routine 300 releases the fifth brake 206e so that the fifth wheel 204e can come up to speed. After releasing the brake 206 on the slower wheel 204, the routine 300 returns to decision block 312 to again determine if the difference in wheel speeds exceeds the preset amount X.

When the difference in wheel speeds no longer exceeds the preset amount X, the routine 300 proceeds to decision block 308 as explained above. In decision block 308, if no control input has been received to release the brakes 206, then the routine 300 proceeds to block 304 and applies the brakes 206. Conversely, if a control input to release the brakes 206 has been received, then in block 309 the routine 300 releases the brakes 206 and the routine is complete.

One feature of aspects of the embodiment described above with reference to FIG. 3 is that if one or both of the first speed sensor 208a or the fifth speed sensor 208e is inoperative, then the first processor 212a will not erroneously release the corresponding brake 206. One advantage of this feature is that the corresponding wheel 204 will have braking capability even if the associated speed sensor 208 is inoperative.

Figure 4:
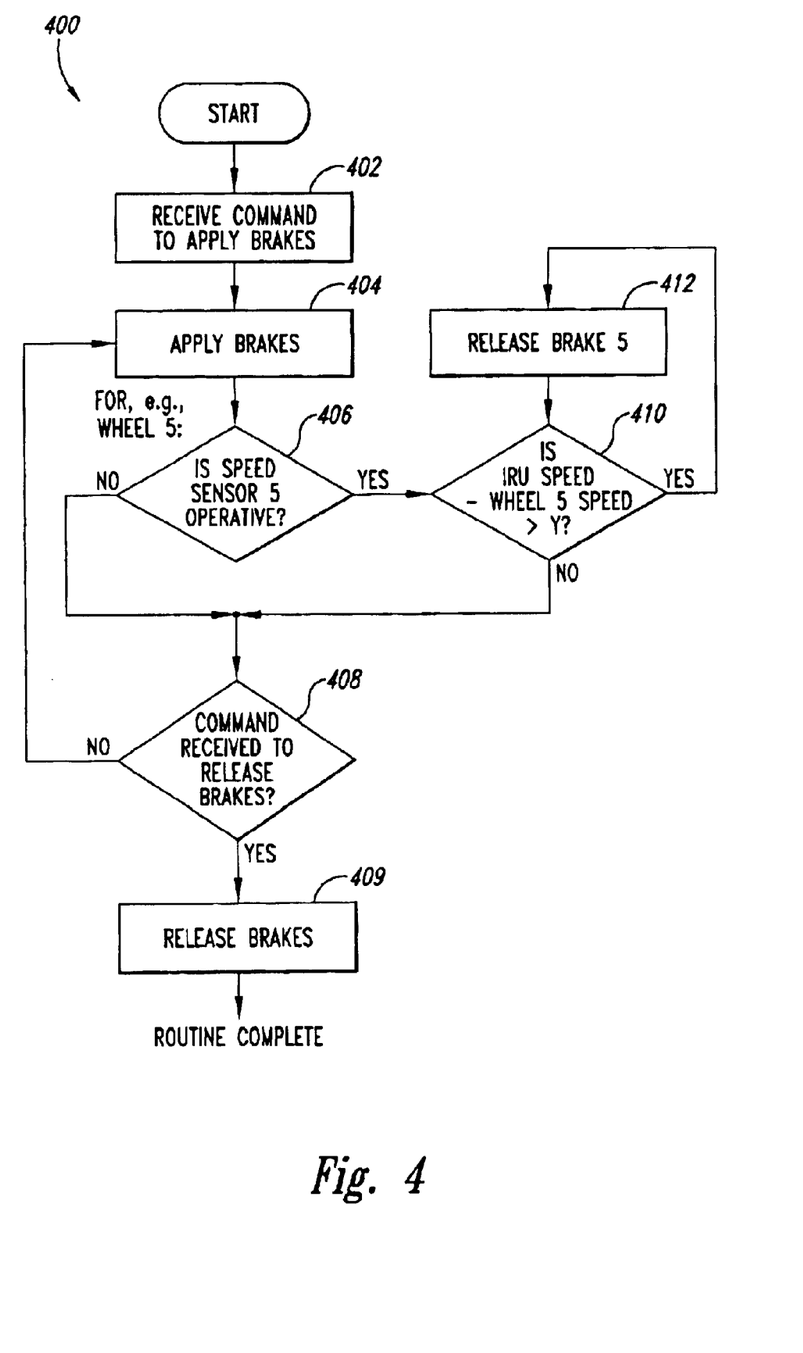
FIG. 4 is a flow diagram illustrating a routine for bypassing hydroplane/touchdown protection in accordance with an embodiment of the invention.

FIG. 4 is a flow diagram illustrating a routine 400 for bypassing hydroplane/touchdown protection in accordance with an embodiment of the invention. For purposes of illustration, the routine 400 is described below with reference to the landing gear system 200 of FIG. 2. In other embodiments, the routine 400 can be implemented by other brake systems for other vehicles. In block 402, the routine 400 receives a control input to apply the brakes 206 to the wheels 204. In block 404, the routine 400 applies the brakes 206 in response to the control input. Referring to an aft landing gear wheel, such as the fifth wheel 204e, for purposes of illustration, in decision block 406, the routine 400 determines if the fifth speed sensor 208e is operative. If the fifth speed sensor 206e is inoperative, then the routine 400 bypasses hydroplane/touchdown protection for the fifth wheel 204e and proceeds to decision block 408 to determine if a control input has been received to release the brakes 206. If no such control input has been received, then the routine 400 returns to block 404 and continues to apply the brakes 206. Conversely, if a control input to release the brakes 206 has been received, then in block 409 the routine 400 releases the brakes 206 and the routine 400 is complete.

Returning to decision block 406, if the fifth speed sensor 208e is operative, then the routine 400 proceeds to decision block 410 to determine if a first speed as determined by the IRU 214 exceeds a second speed as determined by the fifth speed sensor 208e by a preset amount Y. In one embodiment, the preset amount Y can represent a difference in speed between the aircraft and the fifth wheel 204e of such magnitude that the fifth wheel 204e is likely to hydroplane or skid upon touchdown. For example, in one embodiment, the difference in speed can be equivalent to about 50 knots. In other embodiments, the difference in speed can have other values depending on such factors as aircraft configuration. If the first speed does not exceed the second speed by the preset amount Y, then the routine 400 proceeds to decision block 408 and continues as described above. Conversely, if the first speed does exceed the second speed by the preset amount Y or more, then the routine 400 proceeds to block 412 and releases the fifth brake 206e allowing the fifth wheel 204e to come up to speed at touchdown before the fifth brake 206e is applied, thereby preventing skidding or hydroplaning of the fifth wheel 204e at touchdown.

After releasing the fifth brake 206e, the routine 400 returns to decision block 410 to verify that the fifth wheel 204e is now moving at a speed commensurate with the aircraft. If the two speeds are commensurate such that the first speed does not exceed the second speed by at least the preset amount Y, then the routine 400 returns to decision block 408 to determine if a command to release the brakes has been received. If no such command has been received, then the routine 400 returns to block 404 and applies the fifth brake 206e to the fifth wheel 204e. Conversely, if a control input to release the brakes 206 has been received, then in block 409 the routine 400 releases the brakes 206 and the routine 400 is complete.

One feature of aspects of the embodiment described above with reference to FIG. 4 is that if the fifth speed sensor 208e is inoperative, then the first processor 212a will not erroneously release the fifth brake 206a in accordance with the hydroplane/touchdown routine. One advantage of this feature is that the corresponding aft wheel 204e will have braking capability at touchdown even if the associated speed sensor 208e is inoperative.

Figure 5:
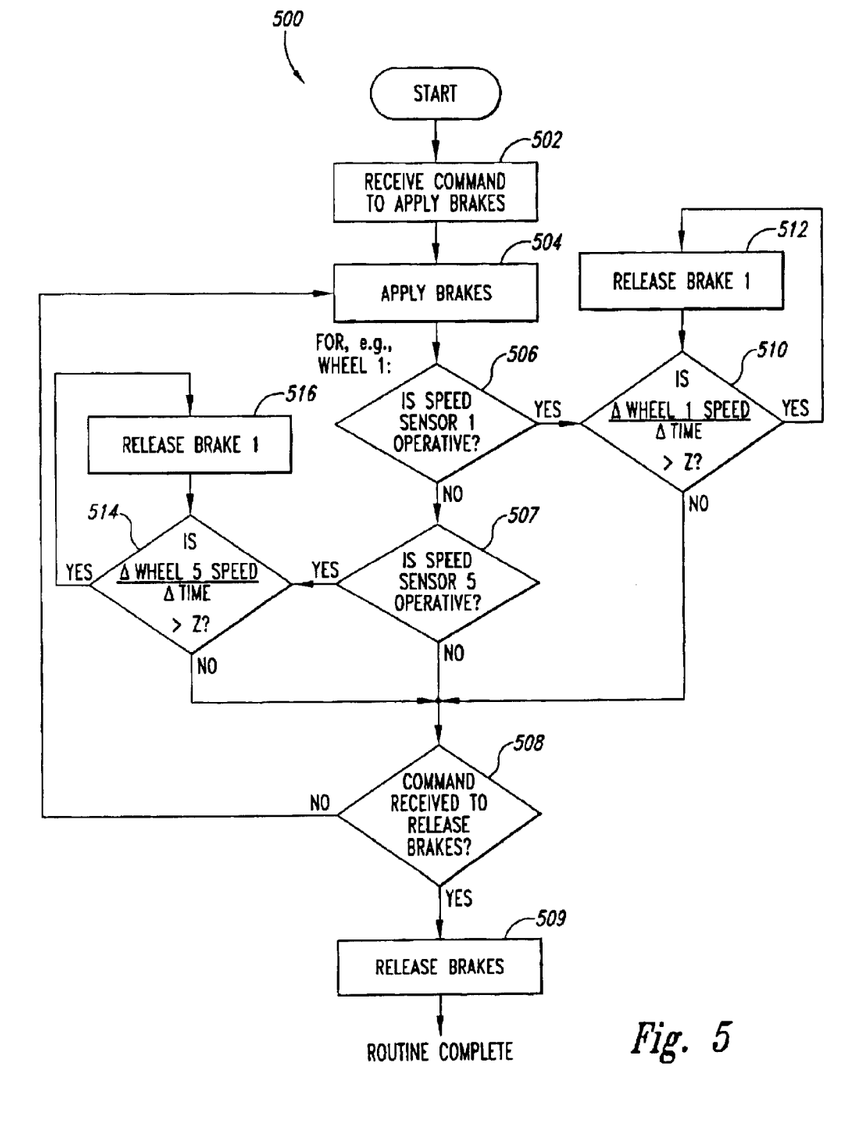
FIG. 5 is a flow diagram illustrating a routine for implementing individual wheel anti-skid protection in accordance with an embodiment of the invention.

FIG. 5 is a flow diagram illustrating a routine 500 for implementing individual wheel anti-skid protection in accordance with an embodiment of the invention. For purposes of illustration, the routine 500 is described below with reference to the landing gear system 200 of FIG. 2. In other embodiments, the routine 500 can be implemented by other brake systems for other vehicles, including land-based vehicles such as automobiles and trucks. In block 502, the routine 500 receives a control input to apply the brakes 206 to the wheels 204. In block 504, the routine 500 applies the brakes 206 in response to the control input. Referring to the first wheel 204a for purposes of illustration, in decision block 506, the routine 500 determines if the first speed sensor 208a is operative. If the first speed sensor 208a is operative, then the routine 500 proceeds to decision block 510 to determine if the deceleration of the first wheel 204a (i.e., the change in wheel speed divided by the change in time) is greater than a preset amount Z. In one embodiment, the preset amount Z can be a deceleration that represents a maximum allowable deceleration before wheel skid for the particular aircraft configuration is likely to occur. If the deceleration of the first wheel 204a exceeds the preset amount Z, then the routine 500 proceeds to block 512 and releases the first brake 206a so that the first wheel 204a can come up to speed before the first brake 206a is applied.

After releasing the first brake 206a, the routine 500 returns to decision block 510 to again check the deceleration of the first wheel 204a. If the deceleration of the first wheel 204a does not exceed the preset amount Z, then the routine 500 proceeds to decision block 508 to determine if a command to release the brakes 206 has been received. If no such command has been received, then the routine 500 returns to block 504 and applies the first brake 206a. Conversely, if a command to release the brakes 206 has been received, then the routine 500 proceeds to block 509 and releases the brakes 206 and the routine 500 is complete.

Returning to decision block 506, if the first speed sensor 208a is inoperative, then in decision block 507, the routine 500 determines if the fifth speed sensor 208e is operative. If the fifth speed sensor 208e is inoperative, then the routine 500 proceeds to decision block 508 and continues as described above. Conversely, if the fifth speed sensor 208e is operative, then in decision block 514 the routine 500 determines if the deceleration of the fifth wheel 204e is greater than the preset amount Z. If the deceleration of the fifth wheel 204e exceeds the preset amount Z, then the routine 500 proceeds to block 516 and releases the first brake 206a. In this manner, the routine 500 is providing anti-skid protection for the first wheel 204a even though the first speed sensor 208a is inoperative. This protection is provided by utilizing wheel speed information from the fifth wheel 204e to determine whether to release the first brake 206a of the first wheel 204a. (Although not the focus of this particular discussion, in another aspect of this embodiment, the fifth brake 206e can also be released if the deceleration of the fifth wheel 204e is found to exceed the preset amount Z). Returning to decision block 514, if, conversely, the deceleration of the fifth wheel 204e does not exceed the preset amount Z, then the routine proceeds to decision block 508 and continues as described above.

One feature of aspects of the embodiment described above with reference to FIG. 5 is that if the first speed sensor 208a is inoperative, then the routine 500 can utilize wheel speed information from the fifth speed sensor 208e to prevent skidding of the first wheel 204a. One advantage of this feature is that the first wheel 204a can have braking capability even if the associated speed sensor 208a is inoperative. Although the foregoing description has referred to the first wheel 204a and the fifth wheel 204e for purposes of illustration, in other embodiments, other wheel groups and/or wheel combinations can be used in accordance with the present invention to provide the secondary anti-skid protection described above.

Figure 6:
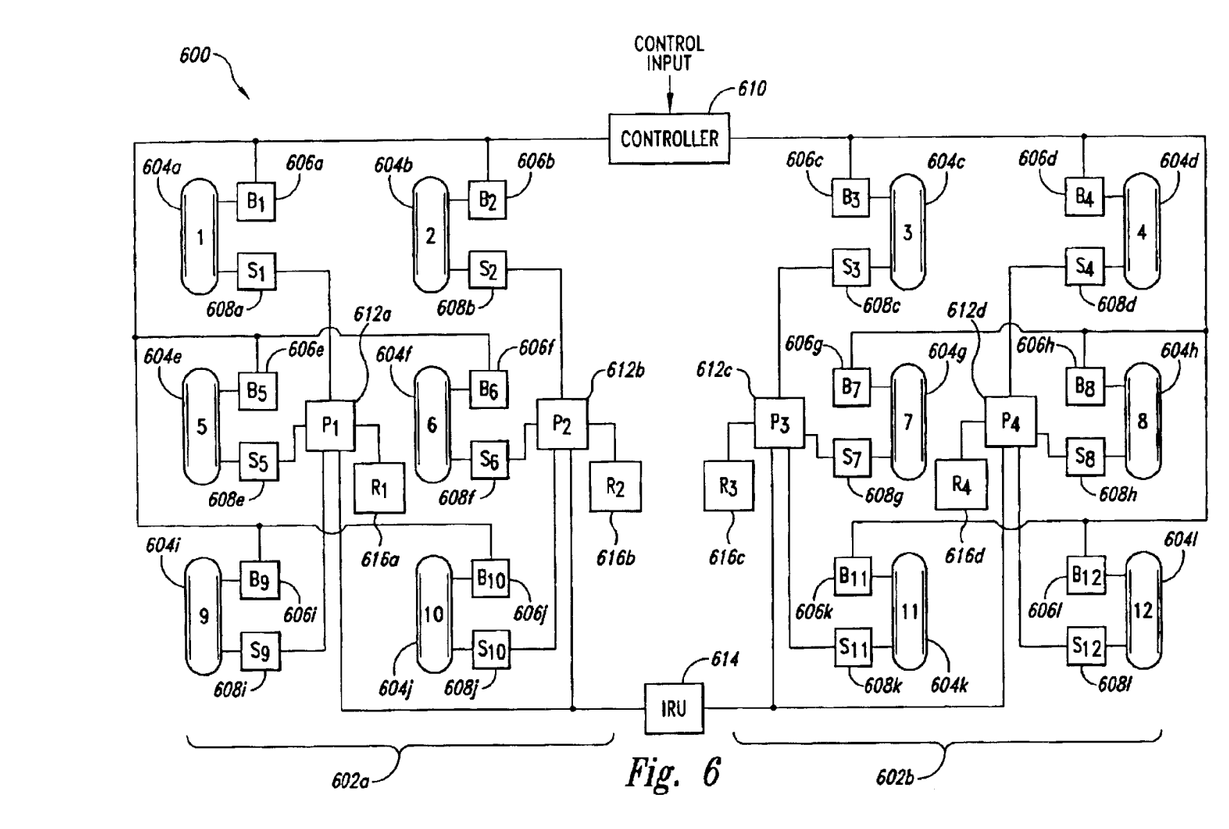
FIG. 6 is a schematic top view of an aircraft main landing gear system configured in accordance with another embodiment of the invention.

FIG. 6 is a schematic top view of an aircraft main landing gear system 600 configured in accordance with another embodiment of the invention. In one aspect of this embodiment, the landing gear system 600 includes a first wheel truck 602a and a second wheel truck 602b. The wheel trucks 602 can be at least generally similar in structure and function to the wheel trucks 202 described above with reference to FIG. 2. In another aspect of this embodiment, however, each of the wheel trucks 602 includes six landing wheels (shown as landing wheels 604a–l) having associated wheel brakes 606 (brakes 606a–l) and associated wheel speed sensors 608 (speed sensors 608a–l). In a further aspect of this embodiment, the landing gear system 600 also includes a wheel brake controller 610, an IRU 614, and four processors 612 (shown as processors 612a–d). The controller 610, the IRU 614, and the processors 612 can be at least generally similar in structure and function to their counterparts described above with reference to FIG. 2.

In yet another aspect of this embodiment, the landing gear system 600 additionally includes four bypass components 616 (shown as bypass components 616a–d). Each of the bypass components 616 is operatively associated with one of the processors 612 in one-to-one correspondence. Each of the processors 612 is in turn operatively associated with a separate wheel group. For example, the first processor 612a is operatively associated with the first wheel 604a, the fifth wheel 604e, and the ninth wheel 604i. As described in greater detail below, the bypass components 616 can be configured to cause the processors 612 to bypass one or more of the wheel anti-skid/anti-lock routines described above if one of the associated speed sensors 608 is determined to be inoperative. One advantage of this feature is that one of the brakes 606 will not be released based on an erroneous indication from the inoperative speed sensor 608 that the corresponding wheel 604 has stopped rotating.

Figure 7:
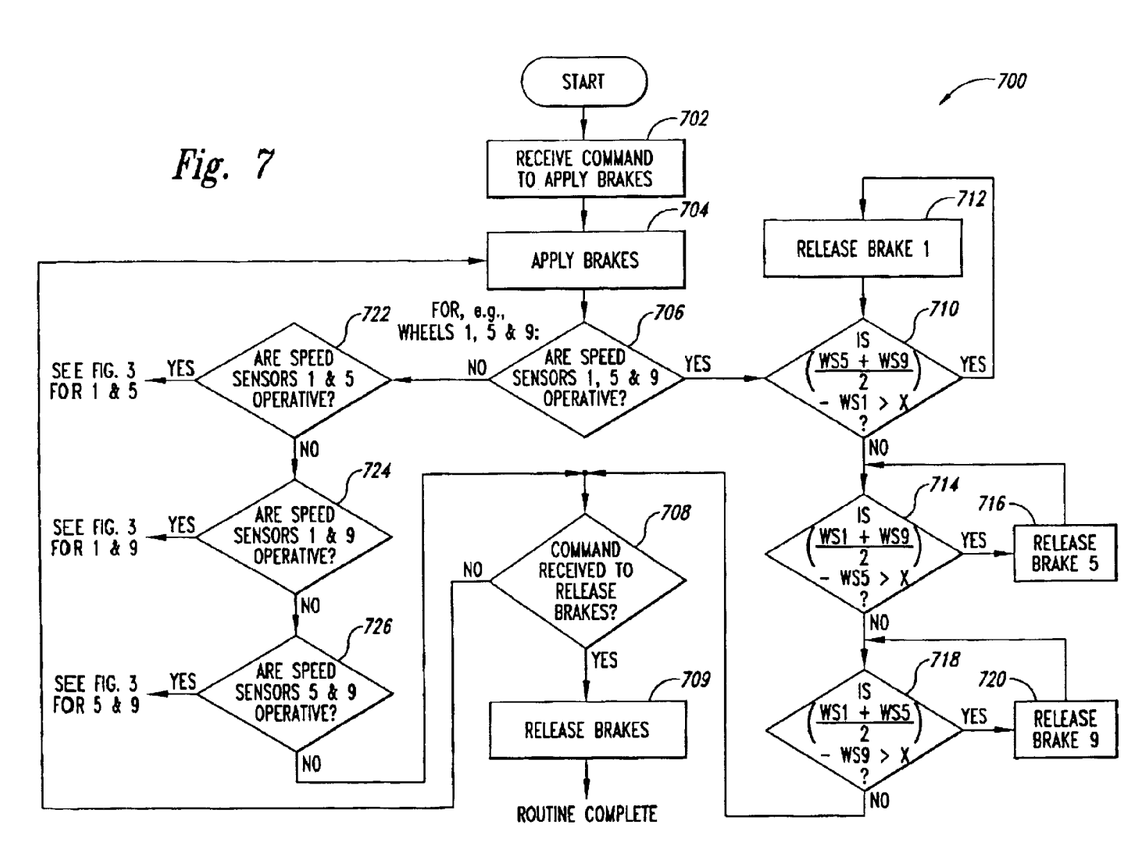
FIG. 7 is a flow diagram illustrating a routine for bypassing locked-wheel protection in accordance with a further embodiment of the invention.

FIG. 7 is a flow diagram illustrating a routine 700 for bypassing locked-wheel protection in accordance with a further embodiment of the invention. For purposes of illustration, the routine 700 is described below with reference to the landing gear system 600 of FIG. 6. In other embodiments, the routine 700 can be implemented by other brake systems for other vehicles having wheel groups with three or more wheels. In block 702, the routine 700 receives a control input to apply the brakes 606 to the wheels 604. In block 704, the routine 700 applies the brakes 606 in response to the control input. Referring to the first wheel 604a, the fifth wheel 604e, and the ninth wheel 604i for purposes of illustration, in decision block 706, the routine 700 determines if the first speed sensor 608a, the fifth speed sensor 608e, and the ninth speed sensor 608i are operative. If all of these speed sensors are operative, then in decision block 710 the routine 700 implements a locked-wheel protection routine by determining if the average speed of the fifth wheel 604e and the ninth wheel 604i exceeds the speed of the first wheel 604a by a preset amount X.

If the average speed of the fifth wheel 604e and the ninth wheel 604i exceeds the speed of the first wheel 604a by the preset amount X, then in block 712, the routine 700 releases the first brake 606a so that the first wheel 604a can come up to speed with the other two wheels in the group. Conversely, if the average speed of the fifth wheel 604e and the ninth wheel 604i does not exceed the speed of the first wheel 604a by the preset amount X, then in decision block 714 the routine 700 determines if the average speed of the first wheel 604a and the ninth wheel 604i exceeds the speed of the fifth wheel 604e by the preset amount X. If so, then in block 716 the routine 700 releases the fifth brake 606e. Conversely, if the average speed of the first wheel 604a and the ninth wheel 604i does not exceed the speed of the fifth wheel 604e by the preset amount X, then the routine proceeds to decision block 718 to determine if the average speed of the first wheel 604a and the fifth wheel 604e exceeds the speed of the ninth wheel 604i by the preset amount X. If so, then in block 720 the routine 700 releases the ninth brake 606i. Conversely, if the average speed of the first wheel 604a and the fifth wheel 604e does not exceed the speed of the ninth wheel 604i by the preset amount X, then the routine 700 proceeds to the decision block 708 to determine if a command to release the brakes 606 has been received. If no such command has been received, then the routine 700 returns to block 704 and continues to apply the brakes 606. Conversely, if such a command has been received, then in block 709 the routine 700 releases the brakes 606 and the routine 700 is complete.

Returning to decision block 706, if at least one of the speed sensors 608a, 608e, and 608i are inoperative, then the routine 700 proceeds to decision block 722 to determine if the first speed sensor 608a and the fifth speed sensor 608e are operative. If these two speed sensors are operative, then the routine 700 can perform the routine 300 described above with reference to FIG. 3 for the first wheel 604a and the fifth wheel 604e. Conversely, if at least one of the first speed sensor 208a and the fifth speed sensor 208e is inoperative, then the routine 700 proceeds to decision block 724 to determine if the first speed sensor 208a and the ninth speed sensor 208i are operative.

If both the first speed sensor 208a and the ninth speed sensor 208i are operative, then the routine 700 can perform the routine 300 of FIG. 3 for the first wheel 604a and the ninth wheel 604i. Conversely, if at least one of the first speed sensors 608a and the ninth speed sensor 608i is inoperative, then the routine 700 proceeds to decision block 726 to determine if both the fifth speed sensor 608e and the ninth speed sensor 608i are operative. If both of these speed sensors are operative, then the routine 700 can perform the routine 300 of FIG. 3 for the fifth wheel 604e and the ninth wheel 604i. Conversely, if at least one of the fifth speed sensor 608e and the ninth speed sensor 608i is inoperative, then the routine 700 proceeds to decision block 708 to determine if a command to release the brakes 606 has been received. If no such command has been received, then the routine 700 returns to block 704 and continues applying the brakes 606. Conversely, if a command to release the brakes 606 has been received, then in block 709 the routine 700 releases the brakes 606 and the routine 700 is complete.

From the foregoing, it will be appreciated that specific embodiments of the invention have been described herein for purposes of illustration, but that various modifications may be made without deviating from the spirit or scope of the invention. Accordingly, the invention is not limited, except as by the appended claims.

I claim:

1. A method for slowing a vehicle on the ground, the vehicle having at least first and second wheels for supporting at least a portion of the vehicle on the ground, the vehicle further having a first brake and a first speed sensor associated with the first wheel, and a second brake and a second speed sensor associated with the second wheel, the method comprising:

receiving a first control input to slow the vehicle;
   in response to receiving the first control input, applying the first brake to the first wheel and the second brake to the second wheel;
   determining if the first and second speed sensors are operative;
   when the first and second speed sensors are operative, determining if a first speed of the first wheel differs from a second speed of the second wheel by a preset amount; and
   if the first speed differs from the second speed by the preset amount, changing the application of at least one of the first and second brakes;
   when at least one of the first and second speed sensors is inoperative, continuing to apply the first brake to the first wheel and the second brake to the second wheel while receiving the first control input.

2. The method of claim 1 wherein changing the application of at least one of the first and second brakes includes releasing at least one of the first and second brakes if the first wheel speed differs from the second wheel speed by the preset amount.

3. The method of claim 1 wherein:

when the first and second speed sensors are operative, changing the application of at least one of the first and second brakes includes releasing at least one of the first and second brakes if the first wheel speed differs from the second wheel speed by the preset amount; and
   when at least one of the first and second speed sensors is inoperative, continuing to apply the first brake to the first wheel and the second brake to the second wheel includes continuing to apply the first and second brakes if the first wheel speed differs from the second wheel speed by the preset amount.

4. The method of claim 1 wherein changing the application of at least one of the first and second brakes includes releasing the first brake if the speed of the first wheel is slower than the speed of the second wheel by the preset amount.

5. The method of claim 1 wherein changing the application of at least one of the first and second brakes includes:

releasing the first brake if the speed of the first wheel is slower than the speed of the second wheel by the preset amount; and
   releasing the second brake if the speed of the second wheel is slower than the speed of the first wheel by the preset amount.

6. The method of claim 1 wherein the first speed sensor includes a first electrical generator driven by the first wheel, and wherein determining if the first and second speed sensors are operative includes determining if the first generator is outputting an electrical signal.

7. The method of claim 1 wherein the vehicle is an aircraft having at least a first wheel truck and a second wheel truck, and wherein applying the first brake to the first wheel and the second brake to the second wheel includes applying the first and second brakes on the first wheel truck.

8. The method of claim 1 wherein the vehicle is an aircraft having at least a first wheel truck and a second wheel truck, and wherein applying the first brake to the first wheel and the second brake to the second wheel includes applying the first and second brakes to tandem wheels on the first wheel truck.

9. The method of claim 1 wherein the vehicle is an aircraft having at least a first wheel truck and a second wheel truck, and wherein applying the first brake to the first wheel and the second brake to the second wheel includes applying the first and second brakes to side-by-side wheels on the first wheel truck.

10. The method of claim 1, further comprising:
receiving a second control input to allow the vehicle to roll free; and
in response to receiving the second control input, releasing the first brake from the first wheel and the second brake from the second wheel.

11. A method for slowing a vehicle on the ground, the vehicle having a wheel for supporting a portion of the vehicle on the ground, the vehicle further having a brake and a speed sensor associated with the wheel, the method comprising:
receiving a control input to slow the vehicle;
in response to receiving the control input, applying the brake to the wheel;
determining if the speed sensor is operative;
when the speed sensor is operative,
determining if a first speed of the wheel differs from a second speed associated with the speed of the vehicle by a preset amount, the first speed being determined with the speed sensor; and
if the first speed differs from the second speed by the preset amount, changing the application of the brake;
when the speed sensor is inoperative, continuing to apply the brake to the wheel while receiving the control input.

12. The method of claim 11 wherein changing the application of the brake includes releasing the brake if the first speed differs from the second speed by the preset amount.

13. The method of claim 11 wherein changing the application of the brake includes releasing the brake if the first speed is slower than the second speed by the preset amount.

14. The method of claim 11 wherein:
when the speed sensor is operative, changing the application of the brake includes releasing the brake if the first speed is slower than the second speed by the preset amount; and
when the speed sensor is inoperative, continuing to apply the brake to the wheel includes continuing to apply the brake if the first speed is slower than the second speed by the preset amount.

15. The method of claim 11 wherein the vehicle further includes a speed measurement device separate from the speed sensor for measuring vehicle speed, and further comprising determining the second speed of the vehicle with the speed measurement device.

16. The method of claim 11 wherein the first speed is a first wheel speed and the second speed is a second wheel speed, and further comprising:
determining a vehicle speed with an inertial reference unit; and
converting the vehicle speed to the second wheel speed.

17. The method of claim 11 wherein the control input is a first control input, and further comprising:
receiving a second control input to allow the vehicle to roll free; and
in response to receiving the second control input, releasing the brake from the wheel.

18. A method for slowing a vehicle on the ground, the vehicle having at least first and second wheels for supporting at least a portion of the vehicle on the ground, the vehicle further having a first brake and a first speed sensor associated with the first wheel, and a second brake and a second speed sensor associated with the second wheel, the method comprising:
receiving a control input to slow the vehicle;
in response to receiving the control input, applying the first brake to the first wheel and the second brake to the second wheel;
determining if the first speed sensor is operative;
when the first speed sensor is operative,
determining if a rate-of-change of speed of the first wheel exceeds a preset rate-of-change of speed, the rate-of-change of speed of the first wheel being determined with the first speed sensor; and
if the rate-of-change of speed of the first wheel exceeds the preset rate-of-change of speed, changing the application of at least the first brake;
when the first speed sensor is inoperative, determining if the second speed sensor is operative;
when the second speed sensor is operative, determining if a rate-of-change of speed of the second wheel exceeds the preset rate-of-change of speed; and
if the rate-of-change of speed of the second wheel exceeds the preset rate-of-change of speed, changing the application of at least the first brake.

19. The method of claim 18 wherein:
when the first speed sensor is operative, changing the application of at least the first brake includes releasing the first brake if the rate-of-change of speed of the first wheel exceeds the preset rate-of-change of speed; and
when the first speed sensor is inoperative, changing the application of at least the first brake includes releasing the first brake if the rate-of-change of speed of the second wheel exceeds the preset rate-of-change of speed.

20. The method of claim 18 wherein:
when the first speed sensor is operative, changing the application of at least the first brake includes releasing the first brake if a deceleration of the first wheel exceeds the preset rate-of-change of speed; and
when the first speed sensor is inoperative, changing the application of at least the first brake includes releasing the first brake if a deceleration of the second wheel exceeds the preset rate-of-change of speed.

21. A method for slowing a vehicle on the ground, the vehicle having at least first, second, and third wheels for supporting at least a portion of the vehicle on the ground, the vehicle further having a first brake and a first speed sensor associated with the first wheel, a second brake and a second speed sensor associated with the second wheel, and a third brake and a third speed sensor associated with the third wheel, the method comprising:
receiving a control input to slow the vehicle;
in response to receiving the control input, applying the first brake to the first wheel, the second brake to the second wheel, and the third brake to the third wheel;
determining if the first, second, and third speed sensors are operative;
when the first, second, and third speed sensors are operative,
determining if a first speed of the first wheel differs from an average speed of the second and third wheels by a preset amount; and
if the first speed differs from the average speed by the preset amount, changing the application of at least the first brake;
when at least the first speed sensor is inoperative, continuing to apply the first brake to the first wheel while receiving the first control input.

22. The method of claim 21 wherein when the first, second, and third speed sensors are operative, changing the application of at least the first brake includes releasing the first brake if the first speed of the first wheel is less than the average speed of the second and third wheels by the preset amount.

23. The method of claim 21 wherein:
when the first, second, and third speed sensors are operative, changing the application of at least the first brake includes releasing the first brake if the first speed of the first wheel is less than the average speed of the second and third wheels by the preset amount; and
when at least the first speed sensor is inoperative, continuing to apply the first brake to the first wheel includes continuing to apply the first brake if the first speed of the first wheel is less than the average speed of the second and third wheels by the preset amount.

24. A method for slowing a vehicle on the ground, the vehicle having a wheel for supporting a portion of the vehicle on the ground, the vehicle further having a brake and a speed sensor associated with the wheel, the method comprising:
receiving a control input to slow the vehicle;
determining if the speed sensor is operative;
when the speed sensor is operative, controlling the brake according to a first routine in response to receiving the control input; and
when the speed sensor is inoperative, controlling the brake according to a second routine in response to receiving the control input, the second routine being different than the first routine.

25. The method of claim 24 wherein controlling the brake according to the second routine includes applying the brake to the wheel in response to the control input.

26. The method of claim 24 wherein the wheel is a first wheel, the brake is a first brake, and the speed sensor is a first speed sensor, and wherein controlling the brake according to the first routine includes:
determining if a first speed of the first wheel differs from a second speed of a second wheel by a preset amount; and
if the first speed differs from the second speed by the preset amount, changing the application of at least one of the first and second brakes.

27. The method of claim 24 wherein the wheel is a first wheel, the brake is a first brake, and the speed sensor is a first speed sensor, and wherein controlling the brake according to the first routine includes:
determining if a first speed of the first wheel differs from a second speed of a second wheel by a preset amount; and
if the first speed differs from the second speed by the preset amount, releasing at least one of the first and second brakes.

28. The method of claim 24 wherein controlling the brake according to the first routine includes:
determining if a first speed of the wheel differs from a second speed associated with the speed of the vehicle by a preset amount, the first speed being determined with the speed sensor; and
if the first speed differs from the second speed by the preset amount, changing the application of the brake.

29. The method of claim 24 wherein controlling the brake according to the first routine includes:
determining if a first speed of the wheel differs from a second speed associated with the speed of the vehicle by a preset amount, the first speed being determined with the speed sensor; and
if the first speed differs from the second speed by the preset amount, releasing the brake.

30. A system for slowing a vehicle on the ground, the vehicle having at least first and second wheels for supporting at least a portion of the vehicle on the ground, the vehicle further having a first brake and a first speed sensor associated with the first wheel, and a second brake and a second speed sensor associated with the second wheel, the system comprising:
means for receiving a first control input to slow the vehicle;
means for applying the first brake to the first wheel and the second brake to the second wheel in response to receiving the first request;
means for determining if the first and second speed sensors are operative;
means for determining if a first speed of the first wheel differs from a second speed of the second wheel by a preset amount when the first and second speed sensors are operative;
means for changing the application of at least one of the first and second brakes if the first speed differs from the second speed by the preset amount; and
means for continuing to apply the first brake to the first wheel and the second brake to the second wheel while receiving the first control input when at least one of the first and second speed sensors is inoperative.

31. The system of claim 30 wherein the means for changing the application of at least one of the first and second brakes includes means for releasing at least one of the first and second brakes if the first wheel speed differs from the second wheel speed by the preset amount.

32. The system of claim 30 wherein:
the means for changing the application of at least one of the first and second brakes when the first and second speed sensors are operative includes means for releasing at least one of the first and second brakes if the first wheel speed differs from the second wheel speed by the preset amount; and
the means for continuing to apply the first brake to the first wheel and the second brake to the second wheel when at least one of the first and second speed sensors is inoperative includes means for continuing to apply the first and second brakes if the first wheel speed differs from the second wheel speed by the preset amount.

33. The system of claim 30 wherein the means for changing the application of at least one of the first and second brakes includes means for releasing the first brake if the speed of the first wheel is slower than the speed of the second wheel by the preset amount.

34. The system of claim 30 wherein the vehicle is an aircraft having at least a first wheel truck and a second wheel truck, and wherein the means for applying the first brake to the first wheel and the second brake to the second wheel includes means for applying the first and second brakes on the first wheel truck.

35. A system for slowing a vehicle on the ground, the vehicle having a wheel for supporting a portion of the vehicle on the ground, the vehicle further having a brake and a speed sensor associated with the wheel, the system comprising:

means for receiving a control input to slow the vehicle;

means for determining if the speed sensor is operative;

means for applying the brake to the wheel according to a first routine in response to receiving the control input when the speed sensor is operative; and means for applying the brake to the wheel according to a second routine in response to receiving the control input when the speed sensor is inoperative, the second routine being different than the first routine.

36. The system of claim 35 wherein the means for controlling the brake according to the second routine includes means for applying the brake to the wheel in response to the control input.

37. The system of claim 35 wherein the wheel is a first wheel, the brake is a first brake, and the speed sensor is a first speed sensor, and wherein the means for controlling the brake according to the first routine includes:

means for determining if a first speed of the first wheel differs from a second speed of a second wheel by a preset amount; and means for changing the application of at least one of the first and second brakes if the first speed differs from the second speed by the preset amount.

38. The system of claim 35 wherein the means for controlling the brake according to the first routine includes:

means for determining if a first speed of the wheel differs from a second speed associated with the speed of the vehicle by a preset amount, the first speed being determined with the speed sensor; and means for changing the application of the brake if the first speed differs from the second speed by the preset amount.

39. An aircraft system comprising:

a first landing wheel configured to support at least a portion of an aircraft on the ground;

at least a second landing wheel configured to support at least a portion of the aircraft on the ground;

a first brake and a first speed sensor associated with the first wheel;

a second brake and a second speed sensor associated with the second wheel; and a processor operatively coupled to the first and second brakes and the first and second speed sensors, wherein the processor is configured to respond to a first control input to slow the aircraft by:

applying the first brake to the first wheel and the second brake to the second wheel;

determining if the first and second speed sensors are operative;

when the first and second speed sensors are operative, determining if a first speed of the first wheel differs from a second speed of the second wheel by a preset amount; and if the first speed differs from the second speed by the preset amount, changing the application of at least one of the first and second brakes;

when at least one of the first and second speed sensors is inoperative, continuing to apply the first brake to the first wheel and the second brake to the second wheel while receiving the first control input.

40. The aircraft system of claim 39 wherein the processor is further configured to release at least one of the first and second brakes if the first wheel speed differs from the second wheel speed by the preset amount when the first and second speed sensors are operative.

41. The aircraft system of claim 39 wherein:

the processor is further configured to release at least one of the first and second brakes if the first wheel speed differs from the second wheel speed by the preset amount when the first and second speed sensors are operative; and the processor is still further configured to continue applying the first brake to the first wheel and the second brake to the second wheel if the first wheel speed differs from the second wheel speed by the preset amount when at least one of the first and second speed sensors is inoperative.

42. The aircraft system of claim 39, further comprising:

a first wheel truck; and a second wheel truck spaced apart from the first wheel truck, wherein the first and second landing wheels are rotatably mounted to the first wheel truck.

43. The aircraft system of claim 39, further comprising:

a first wheel truck; and a second wheel truck spaced apart from the first wheel truck, wherein the first and second landing wheels are rotatably mounted to the first wheel truck in alignment with each other.

44. The aircraft system of claim 39 wherein the processor includes a bypass component configured to cause the processor to continue applying the first brake to the first wheel and the second brake to the second wheel while receiving the first control input when at least one of the first and second speed sensors is inoperative.

* * * * *

UNITED STATES PATENT AND TRADEMARK OFFICE
CERTIFICATE OF CORRECTION

PATENT NO.   : 6,851,649 B1
DATED        : February 8, 2005
INVENTOR(S)  : Michael A. Radford It is certified that error appears in the above-identified patent and that said Letters Patent is hereby corrected as shown below:

Column 3,
Line 36, "seeds" should be -- speeds --;

Signed and Sealed this

Seventeenth Day of May, 2005

JON W. DUDAS
*Director of the United States Patent and Trademark Office*